No. 653,287.
R. F. CORNEIL.
SHAFT OR THILL COUPLING.
(Application filed May 8, 1900.)
Patented July 10, 1900.
(No Model.)
3 Sheets—Sheet 1.
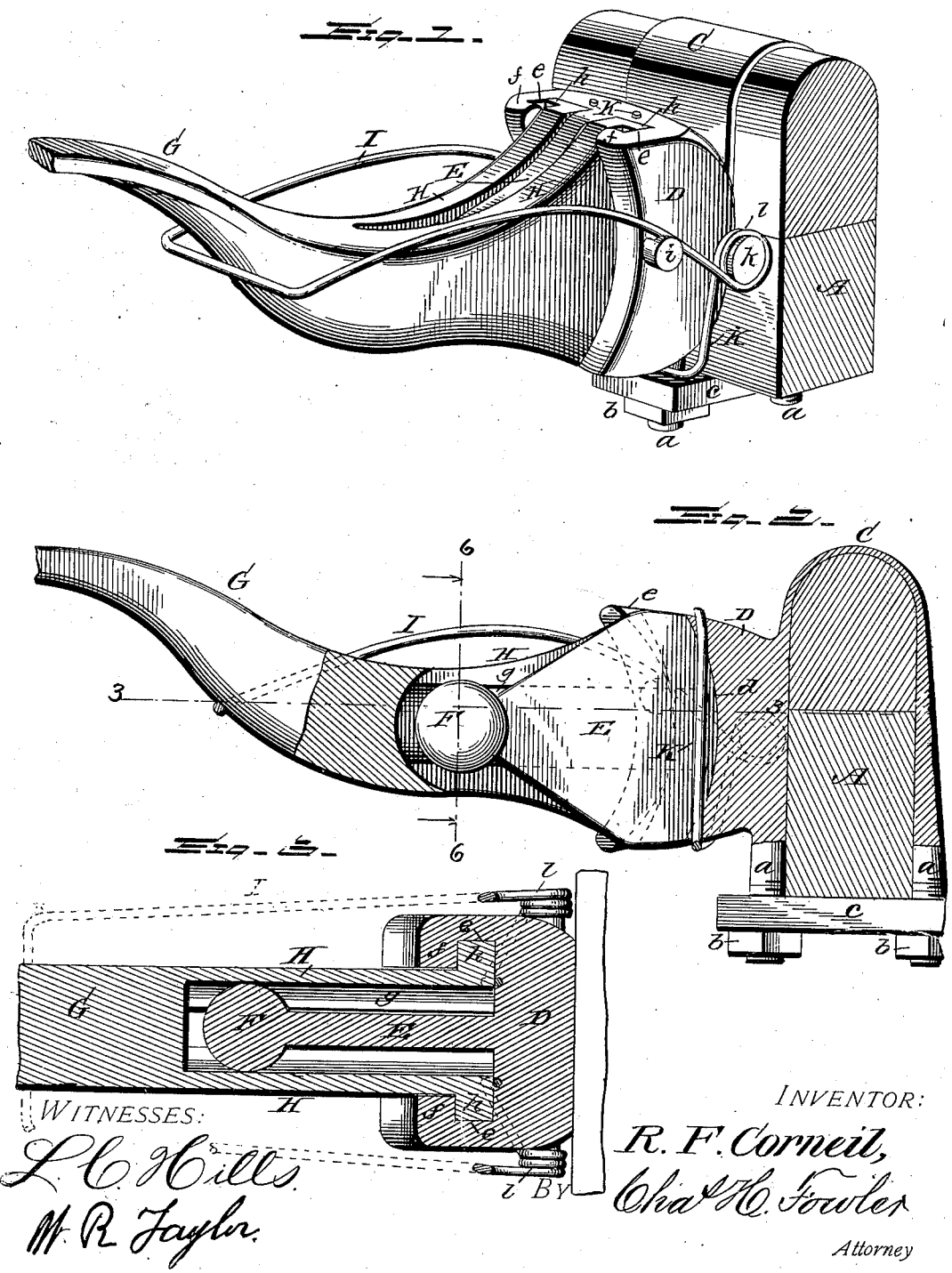
WITNESSES:
L. C. Hills.
W. R. Taylor.
INVENTOR:
R. F. Corneil,
By Chas. H. Fowler
Attorney No. 653,287. Patented July 10, 1900.
R. F. CORNEIL.
SHAFT OR THILL COUPLING.
(Application filed May 8, 1900.)
(No Model.) 3 Sheets—Sheet 2.
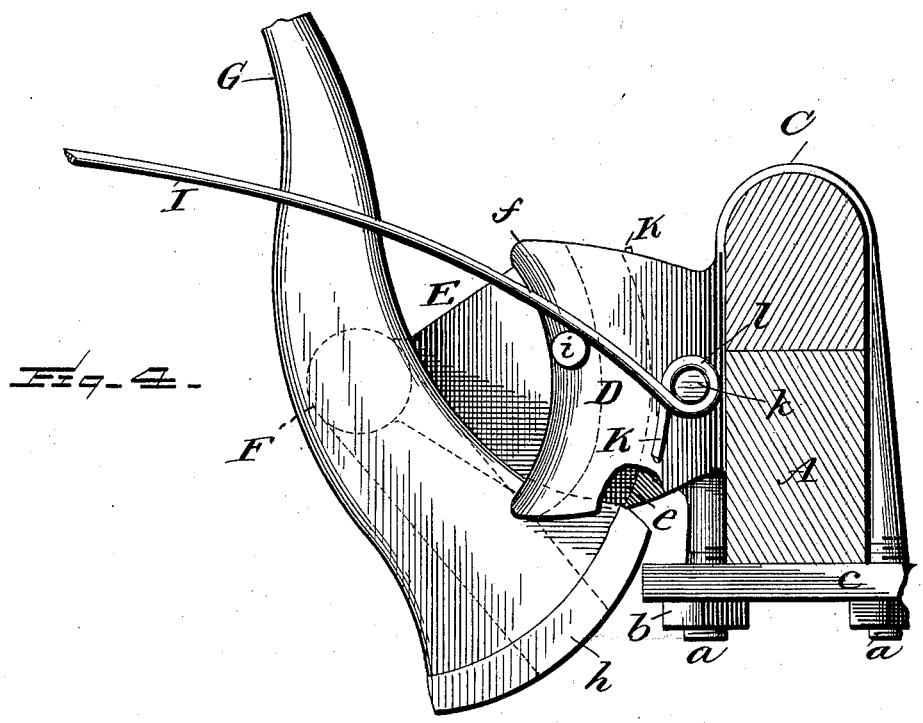
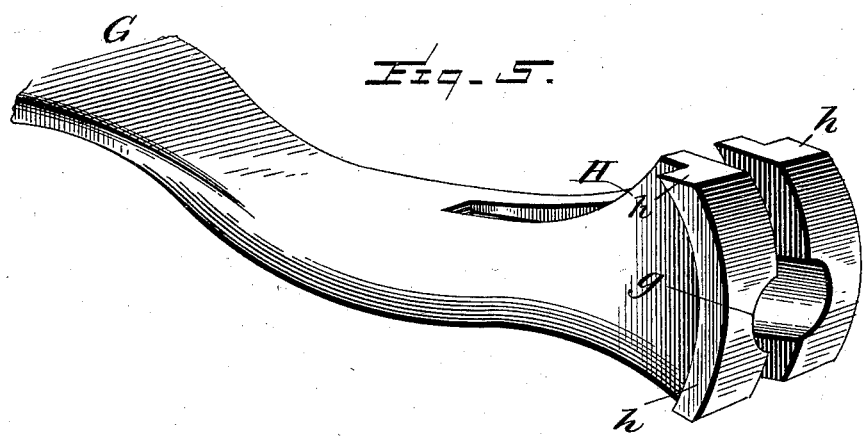
WITNESSES:
L. C. Hills.
W. R. Taylor.
INVENTOR:
R. F. Corneil,
By Chas. H. Fowler
Attorney No. 653,287. Patented July 10, 1900.
R. F. CORNEIL.
SHAFT OR THILL COUPLING.
(Application filed May 8, 1900.)
(No Model.)
3 Sheets—Sheet 3.
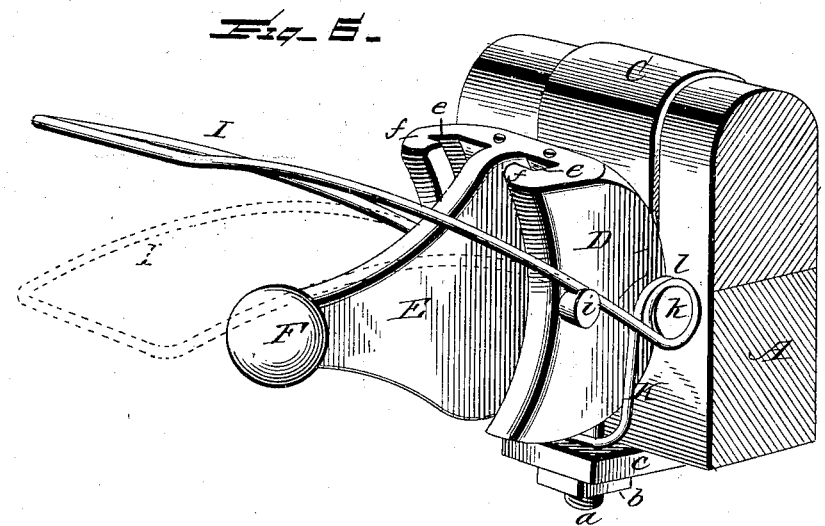
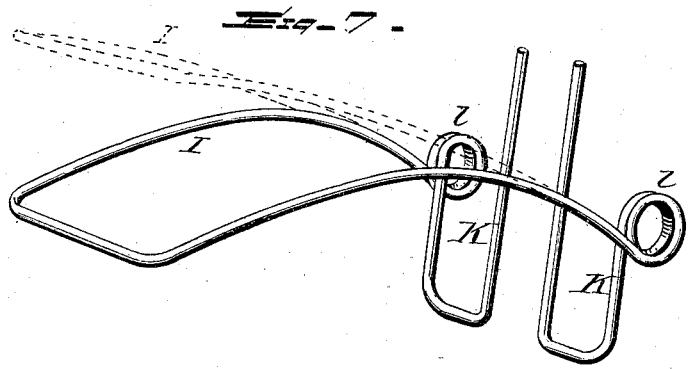
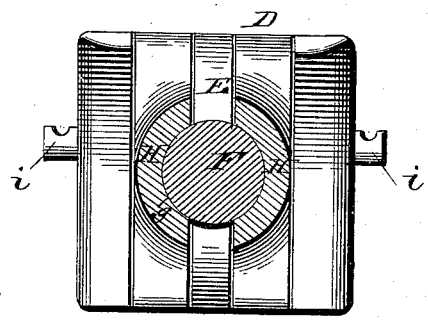
WITNESSES:
L. C. Mills.
W. R. Taylor.
INVENTOR:
R. F. Corneil,
BY Chas. H. Fowler.
Attorney

UNITED STATES PATENT OFFICE.

ROBERT F. CORNEIL, OF PHILLIPSBURG, MONTANA.

SHAFT OR THILL COUPLING.

SPECIFICATION forming part of Letters Patent No. 653,287, dated July 10, 1900.

Application filed May 8, 1900. Serial No. 15,897. (No model.)

*To all whom it may concern:*

Be it known that I, ROBERT F. CORNEIL, a citizen of the United States, residing at Phillipsburg, in the county of Granite and State of Montana, have invented certain new and useful Improvements in Shaft or Thill Couplings; and I do hereby declare that the following is a full, clear, and exact description of the same, reference being had to the annexed drawings, making a part of this specification, and to the letters of reference marked thereon.

The present invention has for its object to provide a simple and effective shaft or thill coupling, and one that will possess strength and durability and also enable the shaft or thill to be easily and quickly attached or detached from its coupling.

The invention consists in a shaft or thill coupling constructed substantially as shown in the drawings and hereinafter described and claimed.

Figure 1 of the drawings is a perspective view of a shaft or thill coupling constructed in accordance with my invention; Fig. 2, a side elevation thereof, partly in section; Fig. 3, a horizontal section taken on line 3 3 of Fig. 2; Fig. 4, a side elevation showing the thill-iron in an elevated or raised position when not required for use; Fig. 5, a detail perspective view of the thill-iron; Fig. 6, a detail perspective view showing the thill-iron removed; Fig. 7, a detail perspective view of the spring; Fig. 8, a transverse sectional view taken on line 6 6 of Fig. 2 looking in the direction of the arrow.

In the accompanying drawings, A represents the axle, to which the usual clip C is connected, said clip having the screw shanks or bolts *a* for engaging the nuts *b* to hold the usual bars *c* thereon, all of which may be of the usual construction.

The coupling-head D has segmental grooved seats *d*, as shown in Fig. 2 of the drawings, and grooved guides *e*, which have shoulders *f* from the top to bottom of the grooves. Between the grooved guides *e* projects a tongue E, which tongue terminates at its outer end in a ball F, adapted to fit in a correspondingly-formed socket *g*, extending lengthwise of the thill-iron, as shown more clearly in Fig. 3 of the drawings. This socket *g* is formed by the two segmental longitudinal grooves in the side walls of the plates H upon the inner end of the thill-iron, these plates being parallel with each other and having a space between them to correspond with the thickness of the tongue E, so as to give free movement of the thill-iron. The plates H have outwardly-projecting flanges *h*, which are disposed on a curve to correspond with the segmental grooved guides *e*, with which the flanges engage, thereby admitting the thill-iron to be moved on the arc of a circle.

Upon the outer sides of the coupling-head D are grooved lugs *i k*, with which engages a peculiarly-constructed spring, which will be now described. This spring is constructed of a single piece of wire, and the object is to serve as an antirattler and also to take the weight of the thills off the animal's back. The wire is bent to form a curved spring-loop I, the outer end of which extends under the thill-iron G and forms a spring-support therefor to take the weight of the thill off the animal's back. This spring-loop I extends over and upon the fulcrum-lugs *i* and engages with the groove thereon, the lugs acting as fulcrums for the spring-loop. At the extremity of the loop I the wire is coiled to form springs *l*, which engage with the grooved lugs *k*, and at a point from the coiled springs *l* the wire extends down and terminates in U-shaped spring antirattler-arms K, the general form of the spring being clearly shown in Fig. 7 of the drawings. The upright portions of the antirattler-arms K extend up through holes in the coupling-head D and on line with the segmental grooved seats *d*, as shown in Fig. 2 of the drawings, the segmental form of the seats allowing the arms of the antirattler to be compressed and bear against the plates H.

A shaft or thill coupling constructed substantially as herein described and shown requires no bolts or other like fastenings and can be attached or detached instantly without any trouble or delay, there being no rubber required to avoid antirattling, the peculiar form of spring herein described serving this purpose and also as a means for holding up the thill and taking the weight thereof off the animal's back. The grooved fulcrum-lugs *i* not only serve as fulcrums for the spring-loop I, but prevent the loop from spreading laterally when properly adjusted.

It will be noticed that the spring-loop I, as indicated in Fig. 1 of the drawings, has an upward pressure against the under side of the thill-iron, thereby giving it quite a lifting tendency and rendering the thill-iron spring-actuated.

In attaching the thill-iron to the coupling-head it is necessary to place the thill-iron in an upright position, so that the socket $g$ will go down over the ball F on the end of the tongue E. The socket $g$ is deep enough so that when the ball F is near the end thereof, as indicated in Fig. 2 of the drawings, the flanges $h$ will be on line with the segmental grooved guides $e$ when the plates are brought into position to engage therewith at the lower ends of the grooves, the same being increased in width at this point to facilitate engagement of the flanges of the plates E. The socket $g$ is also made sufficiently long so that when the thill-iron is thrown up and the flanges $h$ disengaged with the grooved guides $e$ the thill-iron may be adjusted so that the ends of the flanges will abut against the lower or under side of the coupling-head D, and thereby hold up the thill-iron out of the way when not in use, as shown in Fig. 4 of the drawings, this being accomplished with comparative ease and little trouble. To bring the thill-iron to the proper position for use, all that is necessary is to lift it up slightly until the flanges $h$ are on line with the grooved guides $e$, when by further movement of the thill-iron the flanges will engage with the guides, and when the thill-iron is brought into position for use the flanges will bear against the upright arm of the antirattler K in the coupling-head D, which will throw the thill-iron forward and bring the flanges $h$ against the shoulders $f$, and thus prevent any rattling that otherwise would occur.

In the construction of this coupling I wish it understood that many changes or modifications may be resorted to without affecting the essential features of the invention, as I do not wish to be confined to the precise details of construction as herein shown and described.

Having now fully described my invention, what I claim as new, and desire to secure by Letters Patent, is—

1. A shaft or thill coupling, consisting of a coupling-head having segmental coupling-grooves and outwardly-extending pins or lugs upon its sides, a shaft or thill iron adapted to engage the grooves, and a combined shaft or thill support and an antirattler comprising a spring-loop adapted to engage the shaft or thill iron upon the under side thereof, the arms of said loop bearing against the pins or lugs upon the coupling-head and terminating in spring antirattler-arms which extend up into the coupling-grooves and are adapted to bear against the end of the shaft or thill iron, substantially as and for the purpose set forth.

2. A shaft or thill coupling, comprising a coupling-head having segmental grooved guides with inwardly-projecting shoulders, and a central tongue between the guides and terminating at its outer end in a ball, and a shaft or thill iron having a longitudinal socket for engaging with the ball and outwardly-extending flanges to engage with the grooved guides, substantially as and for the purpose described.

3. A shaft or thill coupling, comprising a coupling-head having a projecting tongue terminating in a ball, shouldered grooved upon each side of the tongue, lugs projecting from the sides of the coupling-head, a shaft or thill iron having a longitudinal socket to engage with the ball, and outwardly-extending flanges to engage with the shouldered grooved guides, and a spring-loop adapted to engage the shaft or thill iron upon the under side thereof, the sides of the loop engaging the lugs upon the sides of the coupling-head and terminating in U-shaped spring antirattler-arms, the upright arms thereof extending up through the coupling-head and adapted to bear against the flanges of the thill-iron, substantially as and for the purpose specified.

In testimony that I claim the above I have hereunto subscribed my name in the presence of two witnesses.

ROBERT F. CORNEIL.

Witnesses:
E. H. CAMPBELL,
FANNIE E. CAMPBELL.